(12) United States Patent
Xiao et al.

(10) Patent No.: US 9,211,503 B2
(45) Date of Patent: Dec. 15, 2015

(54) PREPARATION METHOD OF PERFLUORINATED POLYMER HOLLOW FIBER MEMBRANE

(71) Applicant: TIANJIN POLYTECHNIC UNIVERSITY, Tianjin (CN)

(72) Inventors: Changfa Xiao, Tianjin (CN); Zhongqing Miao, Tianjin (CN); Qinglin Huang, Tianjin (CN); Shulin An, Tianjin (CN)

(73) Assignee: TIANJIN POLYTECHNIC UNIVERSITY, Tianjin (CN)

( * ) Notice: Subject to any disclaimer, the term of this patent is extended or adjusted under 35 U.S.C. 154(b) by 0 days.

(21) Appl. No.: 14/358,597

(22) PCT Filed: Jan. 24, 2013

(86) PCT No.: PCT/CN2013/000072
§ 371 (c)(1),
(2) Date: May 15, 2014

(87) PCT Pub. No.: WO2013/127252
PCT Pub. Date: Sep. 6, 2013

(65) Prior Publication Data
US 2014/0311968 A1  Oct. 23, 2014

(30) Foreign Application Priority Data
Mar. 1, 2012 (CN) .......................... 2012 1 0051376

(51) Int. Cl.
*B01D 67/00* (2006.01)
*B01D 71/32* (2006.01)
*B01D 69/08* (2006.01)
*B01D 63/02* (2006.01)
*B01D 71/06* (2006.01)
*B01D 71/82* (2006.01)
*C02F 1/44* (2006.01)

(52) U.S. Cl.
CPC .............. *B01D 67/003* (2013.01); *B01D 63/02* (2013.01); *B01D 67/0093* (2013.01); *B01D 69/087* (2013.01); *B01D 71/32* (2013.01); *B01D 2323/18* (2013.01); *B01D 2325/14* (2013.01); *C02F 1/44* (2013.01)

(58) Field of Classification Search
None
See application file for complete search history.

(56) References Cited

U.S. PATENT DOCUMENTS 4,670,146 A * 6/1987 Inoue et al. .................... 210/490
4,761,233 A * 8/1988 Linder et al. ............. 210/500.37
5,294,338 A * 3/1994 Kamo et al. ................ 210/321.8

FOREIGN PATENT DOCUMENTS

CN       101884878 A   * 11/2010

* cited by examiner

*Primary Examiner* — Krishnan S Menon
*Assistant Examiner* — Ryan B Huang

(57) ABSTRACT

A preparation method of a perfluorinated polymer hollow fiber membrane comprises: evenly mixing a first mixture that is mixed by a perfluorinated polymer, PS, a polymer additive, and a composite pore-forming agent; evenly mixing a second mixture that is mixed by the first mixture and an organic liquid; under 300° C.-350° C., processing the second mixture with a melt to spin by a twin-screw extruder; extruding a hollow fiber by a hollow fiber spinneret; dipping the hollow fiber membrane into deionized water for 48 hours; putting the hollow fiber membrane aired into a concentrated sulfuric acid to process with a sulfonation; washing the hollow fiber membrane by deionized water; and drying the hollow fiber membrane; in such a manner that the hydrophilic perfluorinated polymer hollow fiber membrane is obtained.

10 Claims, No Drawings

PREPARATION METHOD OF PERFLUORINATED POLYMER HOLLOW FIBER MEMBRANE

CROSS REFERENCE OF RELATED APPLICATION

This is a U.S. National Stage under 35 U.S.C 371 of the International Application PCT/CN2013/000072, filed Jan. 24, 2013, which claims priority under 35 U.S.C. 119(a-d) to CN 201210051376.6, filed Mar. 1, 2012.

BACKGROUND OF THE PRESENT INVENTION

1. Field of Invention

The present invention relates to the field of membrane technology, and more particularly to a preparation method of perfluorinated polymer hollow fiber membrane.

2. Description of Related Arts

As a new separation technology, the membrane separation technology now has been widely applied in the fields of chemical industry, energy, medicine, and water treatment. Along with the gradually expanded application field of the membrane, newer and higher requirements are raised to the membrane material, wherein the membrane is not only required to have high selectivity and permeability, but is also required to have sufficiently high mechanical strength, chemical resistance, and thermostability.

The perfluorinated polymer has a structure of complete fluorination, which provides the perfluorinated polymer with some excellent characteristics, such as chemical resistance, thermostability, low friction, non-adhesion, and electrical insulating property. In addition, comparing the perfluorinated polymer with polytetrafluoroethylene (PTFE), the perfluorinated polymer can be processed with melting method, and now has been widely applied in the fields of national defense, electronic product, chemical industry, and machinery manufacture. The perfluorinated polymer, as an excellent membrane-formed material, has received more and more researchers' attentions. However, the surface energy of the perfluorinated polymer is relatively low which induces the poor hydrophilicity. When the perfluorinated polymer is used as the membrane for water-treatment, the membrane fouling is easy to be caused, which plugs the membrane pore, so the membrane is difficult to be washed. To some extent, the application field of the perfluorinated polymer hollow fiber membrane is limited.

SUMMARY OF THE PRESENT INVENTION

Aiming at disadvantages of a conventional technology, an object of the present invention is to provide a preparation method of a hydrophilic perfluorinated polymer hollow fiber membrane. Characteristics of the preparation method of the perfluorinated polymer hollow fiber membrane are that a method is simple, a preparation efficiency is high, and the preparation method of the perfluorinated polymer hollow fiber membrane is suitable for industrialized production. Advantages of the perfluorinated polymer hollow fiber membrane produced are good hydrophilicity, large water flux, a be controlled membrane pore size, and high mechanical strength.

A technical scheme of the present invention to solve the disadvantages of the conventional technology is to design the preparation method of the perfluorinated polymer hollow fiber membrane. The preparation method of the perfluorinated polymer hollow fiber membrane uses a membrane formation system, comprising:

a perfluorinated polymer,
polystyrene (PS),
a polymer additive,
a composite pore-forming agent,
and an organic liquid, wherein, a scope of a mass percent of the perfluorinated polymer is 40 wt %-60 wt %,
the scope of the mass percent of the PS is 2 wt %-10 wt %,
the scope of the mass percent of the polymer additive is 10 wt %-20 wt %,
the scope of the mass percent of the composite pore-forming agent is 10 wt %-30 wt %,
and the scope of the mass percent of the organic liquid is 5 wt %-20 wt %;
A sum of the mass percent of all composition mentioned above is 100%.

The perfluorinated polymer is a copolymerization modification product that is formed by tetrafluoroethylene-based and perfluorinated second monomer, wherein the perfluorinated second monomer is hexafluoropropylene, perfluoroalkylvinyl ether, or ethylene.

A molecular weight of the PS is 50,000~200,000.

The polymer additive is a polymer that contains perfluoroalkanes or a mixture of the polymer that contains perfluoroalkanes in any proportion.

The composite pore-forming agent is a soluble pore-forming agent or an insoluble pore-forming agent. The soluble pore-forming agent is a water-soluble substance, and specifically is a water-soluble inorganic particle, a water-soluble polymer, or a mixture of the water-soluble inorganic particle and the water-soluble polymer in any proportion. The water-soluble polymer is a water-soluble polymer, wherein a temperature of the water-soluble polymer that is processed with a decomposition is higher than the temperature of the water-soluble polymer that is processed with a spinning. The insoluble pore-forming agent is a non-water-soluble inorganic particle.

The organic liquid is a diluent of the polymer additive in a high boiling point.

A preparation method of a perfluorinated polymer hollow fiber membrane comprises steps of:

evenly mixing a perfluorinated polymer, PS, a polymer additive, and a composite pore-forming agent to obtain a first mixture;

evenly mixing the first mixture and an organic liquid to obtain a second mixture;

under 300° C.-350° C., processing the second mixture with a melt to spin by a twin-screw extruder;

extruding a hollow fiber membrane by a hollow fiber spinneret;

dipping the hollow fiber membrane into deionized water for 48 hours;

airing the hollow fiber membrane;

putting the hollow fiber membrane aired into a concentrated sulfuric acid to process with sulfonation;

washing the hollow fiber membrane by the deionized water;

and drying the hollow fiber membrane;

in such a manner that the hydrophilic perfluorinated polymer hollow fiber membrane is obtained;

A method for processing the hollow fiber membrane dried with the sulfonation are described as follows.

The concentrated sulfuric acid is a solvent and a sulfonating agent. A mass of the concentrated sulfuric acid is 5-10 times of the mass of the hollow fiber membrane that is processed with the sulfonation. A temperature of the hollow fiber membrane that is processed with the sulfonation to react is 50° C.-80° C. A time of the hollow fiber membrane that is processed with the sulfonation to react is 5-10 hours.

Comparing with a conventional technology, the preparation method of the perfluorinated polymer hollow fiber membrane of the present invention prepares a hollow fiber membrane, and then skillfully uses a characteristic that a perfluorinated polymer and PS have a certain compatibility, to reasonably process the hollow fiber membrane that is pore-forming with sulfonation, in such a manner that sulfonic acid groups are formed on a surface of the hollow fiber membrane, and a hydrophilicity of the surface of a perfluorinated membrane pore is largely improved. Characteristics of the preparation method of the perfluorinated polymer hollow fiber membrane of the present invention are that a method is simple, a membrane pore size can be controlled, and the perfluorinated polymer hollow fiber membrane can be produced in line continuously. Characteristics of the perfluorinated polymer hollow fiber membrane obtained are that the hydrophilicity is excellent, a water flux is large, and a mechanical strength is high.

These and other objectives, features, and advantages of the present invention will become apparent from the following detailed description, the accompanying drawings, and the appended claims.

DETAILED DESCRIPTION OF THE PREFERRED EMBODIMENT

Referring to preferred embodiments, the present invention are further described.

The present invention designs a preparation method of a perfluorinated polymer hollow fiber membrane. The preparation method of the perfluorinated polymer hollow fiber membrane uses a membrane formation system, comprising:
 a perfluorinated polymer,
 polystyrene (PS),
 a polymer additive,
 a composite pore-forming agent,
 and an organic liquid;
 wherein, a scope of a mass percent of the perfluorinated polymer is 40 wt %-60 wt %,
 the scope of the mass percent of the PS is 2 wt %-10 wt %,
 the scope of the mass percent of the polymer additive is 10 wt %-20 wt %,
 the scope of the mass percent of the composite pore-forming agent is 10 wt %-30 wt %,
 and the scope of the mass percent of the organic liquid is 5 wt %-20 wt %;

A sum of the mass percent of all composition mentioned above is 100%.

The perfluorinated polymer is a membrane-based material. The perfluorinated polymer is a copolymerization modification product that is formed by tetrafluoroethylene-based and perfluorinated second monomer, preferably, poly(tetrafluoroethylene-co-hexafluoropropylene) (FEP), tetrafluoroethylene-perfluoro propylvinyl ether (TFE-PPVE), or a mixture that is mixed by the FEP and the TFE-PPVE in any proportion. The perfluorinated second monomer is hexafluoropropylene, perfluoroalkylvinyl ether, or ethylene. When a content of the perfluorinated second monomer of the copolymerization modification product is increased, a melting point of the copolymerization modification product is decreased, and the copolymerization modification product can be processed with melting to extrude.

The PS is a fiber grade, and a molecular weight thereof is 50,000~200,000. The melting point of the PS and a temperature of the PS that is processed with a decomposition are relatively high. Specifically, under 300° C.-350° C., the PS is difficult to decompose. According to researches, when the mass percent of the PS in the membrane formation system is 2 wt %-10 wt %, the PS and the perfluorinated polymer have a certain compatibility. However, when the scope of the mass percent of the PS in the membrane formation system is increased, the compatibility of the PS and the perfluorinated polymer gets worse, which is not good to use.

The polymer additive is a polymer that contains perfluoroalkanes or a mixture of the polymer that contains perfluoroalkanes in any proportion, preferably, polyvinylidene fluoride (PVDF), polychlorotrifluorethylene (PCTFE), or a mixture that is mixed by the PVDF and the PCTFE in any proportion. According to the researches, along with adding the polymer additive, the temperature of the membrane formation system that is processed with the melting can be decreased. However, when an adding amount of the polymer additive is increased, a spinnability of the membrane formation system trends to be decreased. Therefore, the scope of the mass percent of the polymer additive is ideal to be controlled in 10 wt %-20 wt %.

The composite pore-forming agent is a soluble pore-forming agent and an insoluble pore-forming agent. The soluble pore-forming agent is a water-soluble substance, preferably, a water-soluble inorganic particle, a water-soluble polymer, or a mixture that is mixed by the water-soluble inorganic particle and the water-soluble polymer in any proportion. The water-soluble inorganic particle is preferred to select LiCl, $CaCl_2$, NaCl, or KCl with an average particle size of 0.01 μm-5 μm; the water-soluble polymer is a water-soluble polymer, wherein the temperature of the water-soluble polymer that is processed with the decomposition is higher than the temperature of the water-soluble polymer that is processed with spinning, preferably, polyoxyethylene (PEO). The insoluble pore-forming agent is a non-water-soluble inorganic particle, preferably, $SiO_2$, $CaCO_3$, or a mixture that is mixed by the $SiO_2$ and the $CaCO_3$ in any proportion, wherein the average particle size of the $SiO_2$ and the $CaCO_3$ is 0.01 μm-5 μm. According to the researches, along with increasing the composite pore-forming agent, a porosity and a water flux of a hollow fiber membrane obtained are gradually increasing, but a mechanical property of the hollow fiber membrane obtained is decreased. Therefore, the scope of the mass percent of the composite pore-forming agent in the membrane formation system is ideal to be controlled in 10 wt %-30 wt %.

The organic liquid is a diluent of the polymer additive that is in a high boiling point, preferably, dioctyl phthalate (DOP), dibutyl phthalate (DBP), or a mixture that is mixed by the DOP and the DBP in any proportion. According to the researches, along with increasing the content of the organic liquid, a burr can be decreased in a process of the spinning, which is good for improving a membrane flux. However, along with increasing the content of the organic liquid, a mechanical strength of the hollow fiber membrane is decreased. Therefore, the scope of the mass percent of the organic liquid in the membrane formation system is ideal to be controlled in 5 wt %-20 wt %.

A preparation method of a perfluorinated polymer hollow fiber membrane comprises steps of:
 evenly mixing a perfluorinated polymer, PS, a polymer additive, and a composite pore-forming agent to obtain a first mixture;
 evenly mixing the first mixture and an organic liquid to obtain a second mixture;

under 300° C.-350° C., processing the second mixture with melting to spin by a twin-screw extruder;

extruding a hollow fiber membrane by a hollow fiber spinneret;

dipping the hollow fiber membrane into deionized water for 48 hours;

airing the hollow fiber membrane;

putting the hollow fiber membrane aired into a concentrated sulfuric acid to process with sulfonation;

washing the hollow fiber membrane by the deionized water;

and drying the hollow fiber membrane;

in such a manner that the hydrophilic perfluorinated polymer hollow fiber membrane is obtained Conditions of a method for processing the hollow fiber membrane dried with the sulfonation in the preparation method of the perfluorinated polymer hollow fiber membrane are described as follows.

A solvent is cyclohexane, 1,2-dichloroethane, or a concentrated sulfuric acid. A sulfonating agent is sulfur trioxide, acyl sulfonate, the concentrated sulfuric acid, or chlorosulfuric acid. However, the concentrated sulfuric acid is preferably the solvent and the sulfonating agent.

Conditions of a method for processing the hollow fiber membrane dried with the sulfonation in the concentrated sulfuric acid are described as follows.

The concentrated sulfuric acid is the solvent and the sulfonating agent. A mass of the concentrated sulfuric acid is 5-10 times of the mass of a hollow fiber membrane that is processed with the sulfonation, wherein a temperature of the hollow fiber membrane that is processed with the sulfonation to react is 50° C.-80° C. and a time of the hollow fiber membrane that is processed with the sulfonation to react is 5-10 hours. According to researches, along with increasing the mass of the concentrated sulfuric acid, a carbonization phenomenon is occurred, and a side reaction is occurred more. Therefore, the mass of the concentrated sulfuric acid is better to be 5-10 times of the mass of the hollow fiber membrane that is processed with the sulfonation. The temperature of the hollow fiber membrane that is processed with the sulfonation to react is increased, and a speed of the hollow fiber membrane that is processed with the sulfonation to react is quickened, so that a degree of the hollow fiber membrane that is processed with the sulfonation to react is improved, but if the temperature of the hollow fiber membrane that is processed with the sulfonation to react is too high, a tenacity of the hollow fiber membrane will be decreased, thus, the temperature of the hollow fiber membrane that is processed with the sulfonation to react is better to be controlled under 50° C.-80° C. Along with increasing the time of the hollow fiber membrane that is processed with the sulfonation to react, the speed of the hollow fiber membrane that is processed with the sulfonation to react is gradually quickening, and an ion exchange capacity is correspondingly increased, but if the time of the hollow fiber membrane that is processed with the sulfonation to react is further extended, the ion exchange capacity will no longer be increased, and a side effect is occurred, which decreases a mechanical strength of the hollow fiber membrane. Therefore, the time of the hollow fiber membrane that is processed with the sulfonation to react is better to be controlled in 5-10 hours. An acid remains in the hollow fiber membrane that is processed with the sulfonation, which can be washed by the deionized water. The hollow fiber membrane extruded is put in the concentrated sulfuric acid to process with the sulfonation, wherein the concentrated sulfuric acid and PS occur to react, in such a manner that the hollow fiber membrane contains a certain amount of sulfonic acid groups. The hollow fiber membrane that is processed with the sulfonation changes an original white to be a bronzing, but a mechanical property of the hollow fiber membrane and a pore size of the hollow fiber membrane do not change obviously, which is an innovation of the preparation method of the perfluorinated polymer hollow fiber membrane of the present invention.

The preparation method of the perfluorinated polymer hollow fiber membrane of the present invention can produce the perfluorinated polymer hollow fiber membrane with an excellent hydrophilicity. Under a condition of 0.1 MPa and 25° C., a pure water flux of the perfluorinated polymer hollow fiber membrane obtained is 173 (L/m$^2$·h), a contact angle of the perfluorinated polymer hollow fiber membrane obtained is 69°, and a breaking strength of the perfluorinated polymer hollow fiber membrane obtained is 23 MPa.

Some aspects not described in the present invention are applied in a conventional technology.

Preferred embodiments of the present invention are described as follows, but the preferred embodiments only use to further explain a technology of the present invention, but do not limit a protection scope of claims of the present invention.

EXAMPLE 1

Poly(tetrafluoroethylene-co-hexafluoropropylene) (FEP) is a polymer basement membrane material, wherein a mass percent of hexafluoropropylene of the FEP is 18 wt %. Polyvinylidene fluoride (PVDF) is a polymer additive. Composite pore-forming agent is a mixture that is mixed by SiO$_2$ and polyethylene oxide (PEO), wherein the SiO$_2$ is in a powder and an average particle size of the SiO$_2$ is 0.01 μm. In the mixture that is mixed by the SiO$_2$ and the PEO, the SiO$_2$ is an insoluble pore-forming agent, which occupies 30% of a total amount of the composite pore-forming agent; the PEO is a soluble pore-forming agent, which occupies 70% of the total amount of the composite pore-forming agent. An organic liquid is dioctyl phthalate (DOP). A membrane formation system comprises a perfluorinated polymer, PS, a polymer additive, the composite pore-forming agent, and the organic liquid, wherein, a mass percent of the perfluorinated polymer is 60 wt %, the mass percent of the PS is 5 wt %, the mass percent of the polymer additive is 10 wt %, the mass percent of the composite pore-forming agent is 20 wt %, and the mass percent of the organic liquid is 5 wt %.

A first mixture that is mixed by a perfluorinated polymer, PS, a polymer additive, and a composite pore-forming agent is evenly mixed; a second mixture that is mixed by the first mixture and an organic liquid is evenly mixed; the second mixture is processed with melting to spin by a twin-screw extruder, wherein a first section of the twin-screw extruder is 300° C. and a second section of the twin-screw extruder is 310° C.; a hollow fiber membrane is extruded by a hollow fiber spinneret; the hollow fiber membrane is dipped into deionized water for 48 hours, and the hollow fiber membrane is aired; in such a manner that a hydrophilic perfluorinated polymer hollow fiber membrane is obtained.

Under a condition of 0.1 MPa and 25° C., a pure water flux of the hydrophilic perfluorinated polymer hollow fiber membrane obtained is measured to be 112 (L/m$^2$·h), a contact angle thereof is measured to be 137°, and a breaking strength thereof is 23 MPa.

EXAMPLE 2

As recited in the Example 1, other conditions are not changed, and differences are described as follows.

The hollow fiber membrane aired is put in cyclohexane; a sulfonating agent is a concentrated sulfuric acid, wherein a concentration of the concentrated sulfuric acid is 98 wt %; a use amount of the cyclohexane is 4 times of a mass of the hollow fiber membrane that is processed with a sulfonation; the use amount of the concentrated sulfuric acid is 2 times of the mass of PS of the hollow fiber membrane that is processed with a sulfonation; the hollow fiber membrane is washed by deionized water; the hollow fiber membrane is dried; in such a manner that a hydrophilic perfluorinated polymer hollow fiber membrane is obtained.

Under a condition of 0.1 MPa and 25° C., a pure water flux of the hydrophilic perfluorinated polymer hollow fiber membrane obtained is measured to be 173 (L/m$^2$·h), a contact angle thereof is measured to be 69°, and a breaking strength thereof is 23 MPa. Comparing with the Example 1, the pure water flux of the hydrophilic perfluorinated polymer hollow fiber membrane obtained is increased, the contact angle thereof is decreased, and a hydrophilicity thereof is improved.

EXAMPLE 3

As recited in the Example 1, other conditions are not changed, and differences are described as follows.

The hollow fiber membrane aired is put in a concentrated sulfuric acid to process with a sulfonation, wherein a concentration of the concentrated sulfuric acid is 98 wt %; a mass of the concentrated sulfuric acid is 5 times of the mass of the hollow fiber membrane that is processed with the sulfonation; a temperature of the hollow fiber membrane that is processed with the sulfonation to react is 60° C.; a time of the hollow fiber membrane that is processed with the sulfonation to react is 6 hours; an acid that remains on the hollow fiber membrane is washed by deionized water; the hollow fiber membrane is dried; in such a manner that a hydrophilic perfluorinated polymer hollow fiber membrane is obtained.

Under a condition of 0.1 MPa and 25° C., a pure water flux of the hydrophilic perfluorinated polymer hollow fiber membrane obtained is measured to be 315 (L/m$^2$·h), a contact angle thereof is measured to be 53°, and a breaking strength thereof is 22 MPa. Comparing with the Example 1 and the Example 2, the pure water flux of the hydrophilic perfluorinated polymer hollow fiber membrane obtained is increased, the contact angle thereof is decreased, and the hydrophilicity thereof is improved obviously.

EXAMPLE 4

As recited in the Example 3, other conditions are not changed, and differences are described as follows.

The temperature of the hollow fiber membrane that is processed with the sulfonation to react is changed to be 70° C., and the time of the hollow fiber membrane that is processed with the sulfonation to react is changed to be 5 hours.

Under a condition of 0.1 MPa and 25° C., a pure water flux of a hydrophilic perfluorinated polymer hollow fiber membrane obtained is measured to be 302 (L/m$^2$·h), a contact angle thereof is measured to be 56°, and a breaking strength thereof is 21 MPa. Comparing with the Example 3, the pure water flux of the hydrophilic perfluorinated polymer hollow fiber membrane obtained is decreased, and the contact angle thereof is increased.

EXAMPLE 5

The mass percent of the perfluorinated polymer in the Example 1 is decreased to be 55 wt %, and the mass percent of the PS in the Example 1 is increased to be 10 wt %. A membrane formation system comprises a perfluorinated polymer, PS, a polymer additive, a composite pore-forming agent, and a organic liquid, wherein, a mass percent of the perfluorinated polymer is 55 wt %, the mass percent of the PS is 10 wt %, the mass percent of the polymer additive is 10 wt %, the mass percent of the composite pore-forming agent is 20 wt %, and the mass percent of the organic liquid is 5 wt %.

Other conditions are not changed.

Under a condition of 0.1 MPa and 25° C., a pure water flux of a hydrophilic perfluorinated polymer hollow fiber membrane obtained is measured to be 131 (L/m$^2$·h), a contact angle thereof is measured to be 123°, and a breaking strength thereof is 19 MPa. Comparing with the Example 1, the pure water flux of the hydrophilic perfluorinated polymer hollow fiber membrane obtained is increased, the contact angle thereof is decreased, and the breaking strength thereof is decreased.

EXAMPLE 6

As recited in the Example 5, other conditions are not changed, and differences are described as follows.

A hollow fiber membrane aired is put in a concentrated sulfuric acid to process with a sulfonation; a mass of the concentrated sulfuric acid is 5 times of the mass of the hollow fiber membrane that is processed with the sulfonation; a temperature of the hollow fiber membrane that is processed with the sulfonation to react is 60° C.; a time of the hollow fiber membrane that is processed with the sulfonation to react is 7 hours; an acid that remains on the hollow fiber membrane is washed by deionized water; the hollow fiber membrane is dried; in such a manner that a hydrophilic perfluorinated polymer hollow fiber membrane is obtained.

Under a condition of 0.1 MPa and 25° C., a pure water flux of the hydrophilic perfluorinated polymer hollow fiber membrane obtained is measured to be 334 (L/m$^2$·h), a contact angle thereof is measured to be 49°, and a breaking strength thereof is 17 MPa. Comparing with the Example 5, the pure water flux of the hydrophilic perfluorinated polymer hollow fiber membrane obtained is increased, the contact angle thereof is decreased, the breaking strength thereof is decreased, and a hydrophilicity thereof is improved obviously.

EXAMPLE 7

As recited in the Example 6, the mass of the concentrated sulfuric acid is increased to 7 times of the mass of the hollow fiber membrane that is processed with the sulfonation, and other conditions are not changed.

Under a condition of 0.1 MPa and 25° C., a pure water flux of the hydrophilic perfluorinated polymer hollow fiber membrane obtained is measured to be 346 (L/m$^2$·h), a contact angle thereof is measured to be 47°, and a breaking strength thereof is 17 MPa. Comparing with the Example 6, the pure water flux of the hydrophilic perfluorinated polymer hollow fiber membrane obtained is increased, and the contact angle thereof is decreased.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A preparation method of a perfluorinated polymer hollow fiber membrane, wherein the preparation method of the perfluorinated polymer hollow fiber membrane uses a membrane formation system, comprising:
a perfluorinated polymer,
polystyrene (PS),
a polymer additive,
a composite pore-forming agent,
and an organic liquid;
wherein, a scope of a mass percent of the perfluorinated polymer is 40 wt %-60 wt %,
the scope of the mass percent of the PS is 2 wt %-10 wt %,
the scope of the mass percent of the polymer additive is 10 wt %-20 wt %,
the scope of the mass percent of the composite pore-forming agent is 10 wt %-30 wt %,
and the scope of the mass percent of the organic liquid is 5 wt %-20 wt %;
a sum of the mass percent of all composition mentioned above is 100%;
the perfluorinated polymer is a copolymerization modification product that is formed by tetrafluoroethylene-based and perfluorinated second monomer, wherein the perfluorinated second monomer is hexafluoropropylene, perfluoroalkylvinyl ether, or ethylene;
a molecular weight of the PS is 50,000–200,000;
the polymer additive is a polymer that contains perfluoroalkanes or a mixture of the polymer that contains perfluoroalkanes in any proportion;
the composite pore-forming agent is a soluble pore-forming agent or an insoluble pore-forming agent; the soluble pore-forming agent is a water-soluble substance, and specifically is a water-soluble inorganic particle, a water-soluble polymer, or a mixture that is mixed by the water-soluble inorganic particle and the water-soluble polymer in any proportion; the water-soluble polymer is a water-soluble polymer, wherein a temperature of the water-soluble polymer that is processed with a decomposition is higher than the temperature of the water-soluble polymer that is processed with a spinning; the insoluble pore-forming agent is a non-water-soluble inorganic particle;
the organic liquid is a diluent of the polymer additive with a high boiling point;
a preparation method of a perfluorinated polymer hollow fiber membrane comprises steps of
evenly mixing a perfluorinated polymer, PS, a polymer additive, and a composite pore-forming agent to obtain a first mixture;
evenly mixing the first mixture and an organic liquid to obtain a second mixture;
under 300° C.-350° C., processing the second mixture with a melt to spin by a twin-screw extruder;
extruding a hollow fiber by a hollow fiber spinneret;
dipping the hollow fiber membrane into deionized water for 48 hours;
airing the hollow fiber membrane;
putting the hollow fiber membrane into concentrated sulfuric acid to process with a sulfonation;
washing the hollow fiber membrane with the deionized water;
and drying the hollow fiber membrane;
in such a manner that the hydrophilic perfluorinated polymer hollow fiber membrane is obtained;
a method for processing the dried hollow fiber membrane sulfonation is described as follows;
the concentrated sulfuric acid is a solvent and a sulfonating agent; a mass of the concentrated sulfuric acid is 5-10 times the mass of the hollow fiber membrane that is processed with the sulfonation; a temperature of the hollow fiber membrane that is processed with the sulfonation is 50° C.-80° C.; a time of the hollow fiber membrane that is processed with the sulfonation is 5-10 hours.

2. The preparation method of the perfluorinated polymer hollow fiber membrane, as recited in claim 1, wherein the copolymerization modification product is poly(tetrafluoroethylene-co-hexafluoropropylene) (FEP), tetrafluoroethylene-perfluoro propylvinyl ether (TFE-PPVE), or a mixture that is mixed by the FEP and the TFE-PPVE in any proportion.

3. The preparation method of the perfluorinated polymer hollow fiber membrane, as recited in claim 1, wherein the polymer additive is polyvinylidene fluoride (PVDF) or polychlorotrifluoroethylene (PCTFE).

4. The preparation method of the perfluorinated polymer hollow fiber membrane, as recited in claim 1, wherein the water-soluble inorganic particle is LiCl, $CaCl_2$, NaCl, or KCl with an average particle size of 0.01 μm-5 μm.

5. The preparation method of the perfluorinated polymer hollow fiber membrane, as recited in claim 1, wherein the water-soluble polymer is polyoxyethylene (PEO).

6. The preparation method of the perfluorinated polymer hollow fiber membrane, as recited in claim 1, wherein the non-water-soluble inorganic particle is $SiO_2$, $CaCO_3$, or a mixture that is mixed by the $SiO_2$ and the $CaCO_3$ in any proportion, wherein an average particle size of the $SiO_2$, and the $CaCO_3$ is 0.01 μm-5 μm.

7. The preparation method of the perfluorinated polymer hollow fiber membrane, as recited in claim 1, wherein the organic liquid is dioctyl phthalate (DOP), dibutyl phthalate (DBP), or a mixture that is mixed by the DOP and the DBP in any proportion.

8. A perfluorinated polymer hollow fiber membrane, prepared according to the preparation method of the perfluorinated polymer hollow fiber membrane of claim 1.

9. The preparation method of the perfluorinated polymer hollow fiber membrane, as recited in claim 1, wherein the copolymerization modification product is poly(tetrafluoroethylene-co-hexafluoropropylene) (FEP), tetrafluoroethylene-perfluoro propylvinyl ether (TFE-PPVE), or a mixture that is mixed by the FEP and the TFE-PPVE in any proportion; the polymer additive is polyvinylidene fluoride (PVDF) or polychlorotrifluoroethylene (PCTFE); the water-soluble inorganic particle is LiCl, $CaCl_2$, NaCl, or KCl with an average particle size of 0.01 μm-5 μm; the water-soluble polymer is polyoxyethylene (PEO); and the organic liquid is dioctyl phthalate (DOP), dibutyl phthalate (DBP), or a mixture that is mixed by the DOP and the DBP in any proportion.

10. The preparation method of the perfluorinated polymer hollow fiber membrane, as recited in claim 1, wherein the copolymerization modification product is poly(tetrafluoroethylene-co-hexafluoropropylene) (FEP), tetrafluoroethylene-perfluoro propylvinyl ether (TFE-PPVE), or a mixture that is mixed by the FEP and the TFE-PPVE in any proportion; the polymer additive is polyvinylidene fluoride (PVDF) or polychlorotrifluoroethylene (PCTFE); the non-water-soluble inorganic particle is $SiO_2$, $CaCO_3$, or a mixture that is mixed by the $SiO_2$ and the $CaCO_3$ in any proportion, wherein an average particle size of the $SiO_2$, and the $CaCO_3$ is 0.01 μm-5 μm; and the organic liquid is dioctyl phthalate (DOP), dibutyl phthalate (DBP), or a mixture that is mixed by the DOP and the DBP in any proportion.

* * * * *